United States Patent Office 2,779,686
Patented Jan. 29, 1957

2,779,686

PRINTING PASTE AND METHOD OF PRINTING TEXTILES THEREWITH

Helmut Kleiner, Opladen, and Wolfgang Lehmann, Leverkusen-Bayerwerk, Germany, assignors to Farbenfabriken Bayer Aktiengesellschaft, Leverkusen, Germany, a corporation of Germany No Drawing. Application July 22, 1952, Serial No. 300,339

8 Claims. (Cl. 117—38)

The present invention relates to a new process of decorating substrata, especially textile fabrics.

It has heretofore been proposed to insolubilize soluble or fusible compounds containing two or more primary or secondary amino groups in the molecule by the action of polyfunctional compounds which are capable of reacting with amino groups.

In accordance with the invention it has been found that insoluble coatings, for instance for fixation of pigments in textile printing, for producing films, for impregnating and sizing, are obtained by using soluble or fusible substances, such as polymers, condensation or addition products, containing in their molecule, on the one hand, basic nitrogen groups capable of forming salts and, on the other hand, groups which are capable of reacting with the basic nitrogen groups with cross-linking.

The soluble or fusible polymers employed according to this invention may contain side-chains in their molecule. The basic nitrogen groups may be primary, secondary or tertiary amino groups or qua-ternary ammonium groups.

As soluble or fusible compounds polymers may be employed containing recurring groups of the general formula

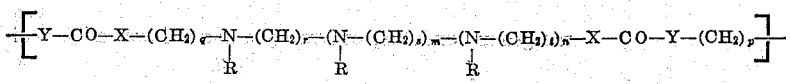

wherein X stands for —NH— or —O—, R stands for H or a lower alkyl radical such as $CH_3$, $C_2H_5$, $C_4H_9$, $C_6H_{13}$ etc., $q$, $r$, $s$ and $t$ stand for an integer from 1 to about 8, $m$ and $n$ stand for an integer from 0 to about 2, and $p$ stands for an integer from 0 to about 8.

The basic polyamides according to the above formula (X=—NH—) may be obtained by reacting polyamines, for instance diprimary polyamines such as diethylene triamine, triethylene tetramine, α,α'-diamino dipropyl diaminobutane etc. with aliphatic dicarboxylic acids or the esters thereof, for instance oxalic acid, succinic acid and sebacic acid.

The corresponding basic esters (X=—O—) are obtainable by using aminoalcohols such as

instead of the polyamines in the above reaction.

Furthermore suitable compounds include polymers of the general formula:

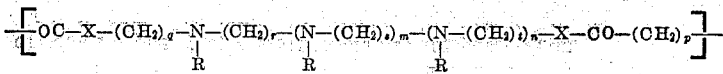

wherein X stands for —NH—, —O— or nothing, Y stands for —NH— or —O—, only one of the radicals X and Y being —O—, R stands for H or a lower alkyl radical, such as $CH_3$, $C_2H_5$, $C_4H_9$ etc., $q$, $r$, $s$ and $t$ stand for an integer from 1 to about 8, $m$ and $n$ stand for an integer from 0 to about 2, and $p$ stands for an integer from 2 to about 8.

Among these products the basic polyureas

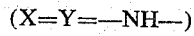

are especially useful according to the invention. The basic polyureas are formed by reacting diisocyanates with aliphatic polyamines, preferably diprimary polyamines, in an alcoholic solution.

The basic urethanes (X=—O—, Y=—NH— and X=—NH—, Y=—O—) may be obtained, for instance either by reaction of aliphatic polyamines, preferably diprimary polyamines, with bis-alkyl-chloroformates or by reaction of N-acetyl-diethanol-amine with hexamethylene diisocyanate and subsequent splitting off of the actyl group.

Basic polyesters (Y=—O—, X=nothing) are formed by reaction of glycols with imino dicarboxylic acids or their esters, for instance imino dipropionic acid, $HOOC(CH_2)_2NH(CH_2)_2COOH$.

When using diamines instead of glycols basic polyamides (Y=—NH—, X=nothing) are obtained in this reaction.

The compounds used as starting materials for the production of the polymers according to the above mentioned formulae are preferably so selected that the indices $p$, $q$, $r$, $s$ and $t$ do not substantially exceed the number eight.

Besides the above mentioned diprimary polyamines long chain compounds containing imino groups may be used which are obtainable by the addition of bifunctional amines to acrylonitrile and subsequent hydrogenation. These compounds may be linked to yield long chain compounds by reaction with diisocyanates, dicarboxylic acids or their acid dichlorides, diacrylamides etc. For instance acrylonitrile is added to hexamethylene diamine on both sides and hydrogenated. The addition of the reaction product to a further acrylonitrile molecule and subsequent hydrogenation is repeated several times until the desired product is obtained:

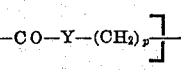
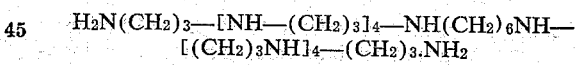

This poly-base may be prolonged at the terminal amino groups by further reaction with bifunctional compounds, for instance oxalyl chloride, phosgene, diisocyanates and diacrylamides (in this reaction the terminal —$NH_2$— group is added to the acrylic double bond).

Furthermore as examples of basic compounds according to the invention may be named basic polysaccharides, the so-called aminocellulose, amino-starch, addition products of ethylene imino and cellulose, derivatives of protein substances, for instance aminolysates and hydrolysates of glue, casein and gelatine.

The polymers to be used according to the invention are preferably applied in solution in order to inhibit a premature reaction of the amino groups with the other reactive substituents in the molecule. It is of advantage to protect the amino groups by salt formation. Especially useful for this purpose are acids which are easily valatile or can easily be separated at higher temperatures, for instance weak organic acids such as acetic acid and lactic acid. In general the intermolecular cross-linking is carried out at temperatures from about 100° to about 200° C. When strong acids are employed the amino groups can be set free by an alkaline treatment of the impregnated or decorated material, for instance a printed fabric. In the latter case cross-linking may be effected at somewhat lower temperatures, say about 80° to about 150° C.

The process of the invention may serve for various purposes, for instance for fixing pigments in textile printing, for impregnating, for preparing films or coatings, sizing, making water-repellent of textiles etc.

The present invention is further illustrated by the following examples without being restricted thereto, the parts being by weight:

*Example 1*

A basic polyurea of the viscosity number $z\eta=138$, which is prepared from 0.2 mol of diethylene triamine, 0.8 mol of $\gamma.\gamma'$-diaminodipropylmethylamine and 1.0 mol of hexamethylene diisocyanate is used for printing fabrics of cotton and staple fiber in the following paste:

400 parts of a 10% acetic acid solution of the basic polyurea,
150 parts of a 15% paste of copper phthalocyanine,
550 parts of water.

By aftertreating the printing designs at 100° C. for 5 minutes they are highly resistant to light and washing.

*Example 2*

A basic polyurethane of the viscosity number $z\eta=70$, which has been prepared from 1 mol of dipropylene triamine and 1 mol of butane-bis-alkylchloroformate is employed in the following printing paste:

200 parts of a 40% acetic acid solution of the basic polyurethane,
50 parts of a 15% paste of copper phthalocyanine,
35 parts of tragacanth,
400 parts of water.

By heating the printed material to 130° C. for 10 minutes the print shows a uniform blue color and is extraordinarily fast to light and washing.

*Example 3*

A polyurea of the viscosity number $z\eta=150$, which has been prepared from 1 mol of $\gamma.\gamma'$ diaminodipropylmethylamine and 1 mol of hexamethylene diisocyanate, is used for impregnating textiles in form of a 10% acetic acid aqueous solution. By heating the fabric to 145° C. for some time a finish is obtained which is fast to washing.

*Example 4*

A polyester prepared from 3 mols of adipic acid, 1 mol of trimethylol propane and 3 mols of butylene glycol, which has a molecular weight of about 1200 and a hydroxyl number of about 100, is reacted with hexa-methylene diisocyanate so that the content of free N=C=O amounts to about 4.6%.

100 parts of the above isocyanate modified polyester are dissolved in
100 parts of benzene and gradually added with stirring to
105 parts of N-methylpropylene diamine and
100 parts of benzene.

The paste is heated to the boil for ½ hour, the benzene is distilled off and the residue neutralized with dilute acetic acid. The paste is adjusted to a content of 40%. The viscous solution can be diluted with water in all proportions. The content of basic, salt forming nitrogen amounts to 1.4% calculated on the solid substance.

By applying the solution to a substratum, for instance a fabric, and heating to 130° C. for 30 minutes a rubber-like, water-insoluble coating is obtained. The content of basic nitrogen in the coating, which can be determined by titration, has been reduced to 0.2%.

We claim:

1. A printing paste consisting of an aqueous solution of a salt of (A) an acid and (B) a basic polymer containing recurring groups of the general formulae selected from the group consisting of (1)

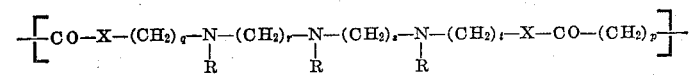

wherein X stands for a radical selected from the group consisting of —NH— and —O—, R stands for a radical selected from the group consisting of hydrogen and a lower alkyl radical, q, r, s and t stand for an integer from 2 to 3, and p stands for an integer from 0 to 4, and (2)

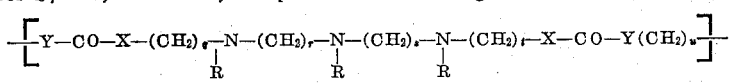

wherein X stands for a radical selected from the group consisting of —NH—, —O— and a C—C linkage, Y stands for a radical selected from the group consisting of —NH— and —O—, only one of the radicals X and Y being —O—, R stands for a radical selected from the group consisting of hydrogen and a lower alkyl radical, q, r, s and t stand for an integer from 2 to 3, and u stands for an integer from 2 to 4, a thickening agent and a pigment.

2. A printing paste as claimed in claim 1 in which the acid is a weak and volatile acid.

3. A printing paste as claimed in claim 2 in which the polymer contains recurring groups of the formula

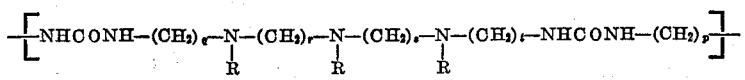

wherein R stands for a radical selected from the group consisting of hydrogen and a lower alkyl radical, q, r, s and t stand for an integer from 2 to 3, and p stands for an integer from 2 to 4.

4. A printing paste as claimed in claim 2 in which the polymer contains recurring groups of the formula

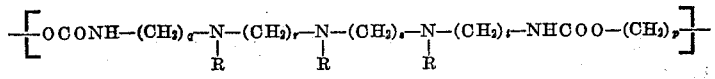

wherein R stands for a radical selected from the group consisting of hydrogen and a lower alkyl radical, q, r, s and t stand for an integer from 2 to 3, and p stands for an integer from 2 to 4.

5. A printing paste as claimed in claim 2 in which the polymer contains recurring groups of the formula

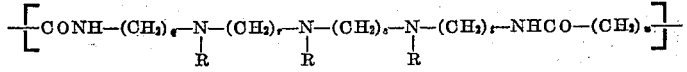

wherein R stands for a radical selected from the group consisting of hydrogen and a lower alkyl radical, q, r, s and $t$ stand for an integer from 2 to 3, and $u$ stands for an integer from 0 to 4.

6. The process for printing textiles which comprises applying to said textiles an aqueous printing paste comprising a salt of (A) an acid and (B) a linear high molecular weight compound containing recurring groups of the general formulae selected from the group consisting of (1)

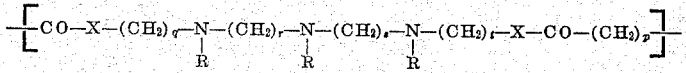

wherein X stands for a radical selected from the group consisting of —NH— and —O—, R stands for a radical selected from the group consisting of hydrogen and a lower alkyl radical, $q$, $r$, $s$ and $t$ stand for an integer from 2 to 3, and $p$ stands for an integer from 0 to 4, and (2)

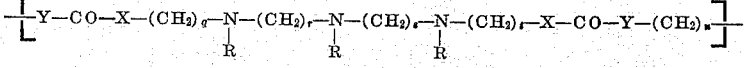

wherein X stands for a radical selected from the group consisting of —NH— and —O—, R stands for a radical selected from the group consisting of —NH— and —O—, only one of the radicals X and Y being —O—, R stands for a radical selected from the group consisting of hydrogen and a lower alkyl radical, $q$, $r$, $s$ and $t$ stand for an integer from 2 to 3, and $u$ stands for an integer from 2 to 4, a thickening agent and a pigment, and then developing at temperatures from about 80° C. to about 200° C.

7. The process as claimed in claim 6 wherein the acid is a weak and volatile acid.

8. The process for printing textiles which comprises applying to said textiles an aqueous printing paste comprising a salt of (A) an acid and (B) a linear high molecular weight compound containing recurring groups of the general formulae selected from the group consisting of (1)

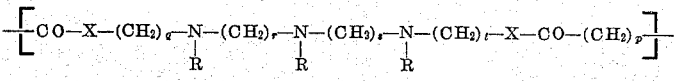

wherein X stands for a radical selected from the group consisting of —NH—, —O— and a C—C linkage, Y selected from the group consisting of hydrogen and a lower alkyl radical, $q$, $r$, $s$ and $t$ stand for an integer from 2 to 3, and $p$ stands for an integer from 0 to 4, and (2)

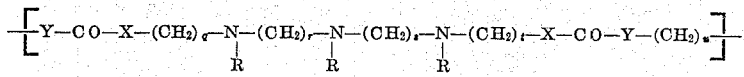

wherein X stands for a radical selected from the group consisting of —NH—, —O— and a C—C linkage, Y stands for a radical selected from the group consisting of —NH— and —O—, only one of the radicals X and Y being —O—, R stands for a radical selected from the group consisting of hydrogen and a lower alkyl radical, $q$, $r$, $s$ and $t$ stand for an integer from 2 to 3, and $u$ stands for an integer from 2 to 4, a thickening agent and a pigment, and then developing by treating the textiles with an alkaline medium selected from the group consisting of an aqueous solution of an alkali metal hydroxide, alkali metal carbonate and ammonia, and developing at temperatures of about 80° to about 150° C.

References Cited in the file of this patent

UNITED STATES PATENTS

| | | |
|---|---|---|
| 2,169,366 | Meigs | Aug. 15, 1939 |
| 2,206,928 | Ulrich | July 9, 1940 |
| 2,239,718 | Izard | Apr. 29, 1941 |
| 2,274,831 | Hill | Mar. 3, 1942 |
| 2,325,567 | Bock | July 27, 1943 |
| 2,343,808 | Schlack | Mar. 7, 1944 |
| 2,356,702 | Schlack | Aug. 22, 1944 |
| 2,643,958 | Kleiner | June 20, 1953 |

FOREIGN PATENTS

| | | |
|---|---|---|
| 882,841 | France | June 16, 1943 |